Dec. 20, 1949  H. J. ROSE ET AL  2,491,519
COAGULATION OF BUTADIENE-ACRYLONITRILE COPOLYMERS
Filed May 25, 1945
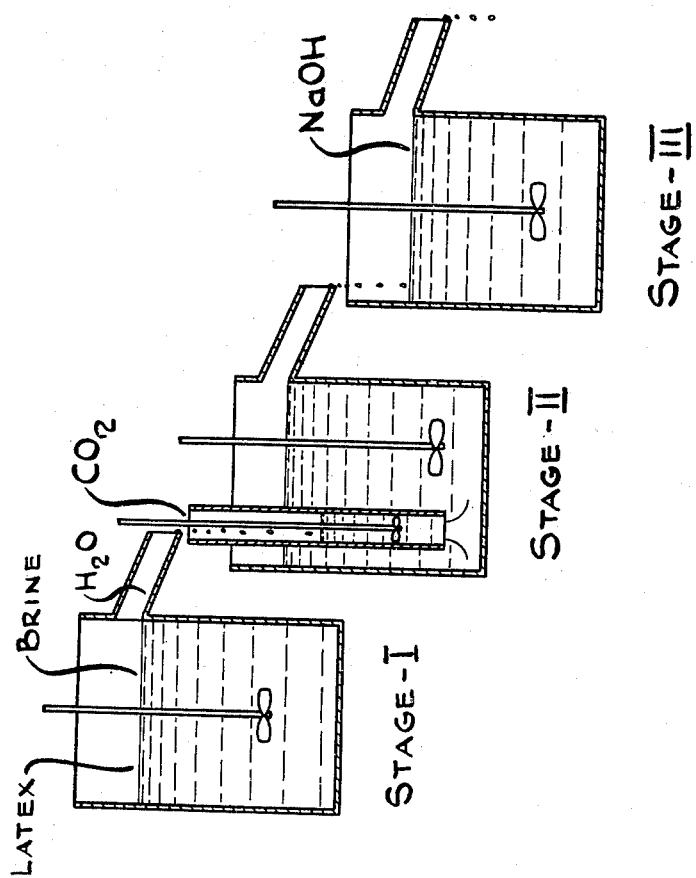
Harold J. Rose
Lewis C. Price  Inventors
By P. L. Young  Attorney Patented Dec. 20, 1949

2,491,519

UNITED STATES PATENT OFFICE 2,491,519

COAGULATION OF BUTADIENE-ACRYLO-NITRILE COPOLYMERS

Harold J. Rose and Lewis C. Price, Baton Rouge, La., assignors to Standard Oil Development Company, a corporation of Delaware Application May 25, 1945, Serial No. 595,716

4 Claims. (Cl. 260—83.3)

This invention pertains to synthetic rubber-like materials prepared by the polymerization of conjugated diolefins in aqueous emulsion and particularly to a method of precipitating or coagulating the polymer latices.

Various synthetic rubber-like materials, commonly known as the "Bunas" have been prepared by polymerizing one or more conjugated diolefins such as butadiene-1,3, isoprene, piperylene or dimethyl butadiene or mixtures of such diolefins with compounds containing a single C=C group and capable of copolymerizing with conjugated diolefins in aqueous emulsion, such as nitriles, styrenes, fumaric acid esters, acrylic acid esters and unsaturated ketones and the like. The polymers are prepared by emulsifying the reactants in from an equal to a two-fold quantity of water, using as the emulsifier water-soluble soaps such as alkali metal or ammonium salts of oleic, stearic or selectively hydrogenated fatty acid mixtures derived from tallow as well as various surface active agents such as salts of alkylated naphthalene sulfonic acids, fatty alcohol sulfuric acid esters, aliphatic and olefinic sulfonic acids and also acid addition salts of high molecular weight alkyl amines. The polymerization is ordinarily effected at or slightly above room temperature using a compound capable of liberating oxygen under the reaction conditions, such as hydrogen peroxide, benzoyl peroxide, and alkali metal or ammonium persulfates and perborates as the polymerization catalyst. It is also generally desirable to provide a polymerization modifier such as diisopropyl xanthogen disulfide or an aliphatic mercaptan such as hexyl, octyl, dodecyl mercaptans, or a mixture of mercaptans such as is obtained from commercial lauryl alcohol. After a substantial time interval, the polymerization mixture becomes a latex or dispersion of solid polymer particles in water and unreacted materials.

In order to utilize the polymer for "dry" rubber purposes, as contrasted to latex operations, it is necessary that this dispersion of polymer particles be broken or coagulated in order to obtain the polymer in the desired coherent form, substantially free from water and free from unpolymerized materials, catalyst and other impurities. It has been proposed to use considerable quantities of acid to coagulate these dispersions. This procedure has not been particularly satisfactory because the relatively large quantity of acid required for the coagulation is harmful to the physical characteristics of the polymer and is injurious to the polymerization equipment, especially if sulfuric or hydrochloric acid is used. Of the several available acids, acetic acid is the least harmful to the physical characteristics of the polymer and to the reaction equipment, but it is unduly expensive. A further disadvantage of acids as coagulants is the fact that the acids react chemically with the soaps which are most frequently used as the emulsifying agent, converting them to free fatty acids which are insoluble in water and are precipitated with the polymer. Most of the free fatty acids, particularly if present in substantial quantities, are harmful to the quality of the polymer and are difficult to remove from the polymer. Also, such acids precipitate the polymer from the emulsion in the form of large, coherent masses which are difficult and expensive to wash and process.

It has also been suggested to effect the coagulation of these latices by the use of solutions of various salts, especially sodium chloride. When used alone, however, salt solutions are unsatisfactory because of the relatively large quantities required and because they precipitate the polymer in a very finely divided condition which is very difficult to wash free from impurities and subsequently to dry.

Efforts at developing a method for continuously coagulating "Buna" latices prepared by the soap emulsion technique have been unsuccessful due to the instability of these latices and because of the inherent nature of these polymers, particularly the butadiene-acrylonitrile type polymers. It is necessary to control rather carefully the conditions under which nitrile polymers are coagulated if satisfactory properties in the separated polymer are to be obtained. In general, these polymers are coagulated batchwise in the presence of about 5 pounds pressure of butadiene by the addition of brine to the latex with good agitation and then adjusting the particle size by adding either gaseous or solid carbon dioxide. The system is very sensitive to changes in the pH value, to the concentration of the brine, to the total quantity of brine, to the per cent of total solids in the latex and to the temperature at which the coagulation is carried out. Because of this sensitivity no practical method has been developed for carrying out the coagulation on a continuous basis.

It is the object of this invention to provide the art with a method of coagulating synthetic rubber latices prepared by the polymerization of olefinic materials in aqueous emulsion, on a continuous basis.

It is a further object of this invention to provide a novel method for the continuous coagulation of butadiene-acrylonitrile copolymers in particular and in general all polymers prepared by the soap emulsion technique.

These and other objects will appear more clearly from the detailed description and claims which follow.

We have now found that polymer latices prepared by the soap emulsion technique may be effectively coagulated on a continuous basis if carried out in the following three-stage system. In the first stage, creaming is effected by the simultaneous addition of the polymer latex and an aqueous solution of a water-soluble salt which does not react with the soap to form an insoluble precipitate, such as sodium chloride. Coagulation occurs in the second stage by addition of carbon dioxide, preferably in a draft tube provided with a propeller-type agitator for forcing the coagulated polymer particles out of the bottom of the draft tube. In the third stage, a strongly alkaline substance is added in order to convert excess or free fatty acid present into soap. In this way, it is possible to carry out the coagulation continuously on a practical basis, the separated or coagulated polymer being of equal or better quality than that obtained by the standard batch coagulation described above. The particular combination of creaming with brine or the like, coagulating with carbon dioxide and aftertreating with alkali produces a non-tacky slurry which can be easily filtered and reslurried in water. Previously it was found necessary to effect the coagulation in the presence of a repressuring agent such as butadiene in order to get a comparable, non-tacky coagulate.

Reference is made to the accompanying drawing illustrating diagrammatically one form of apparatus suitable for carrying out the process in accordance with the present invention.

In the drawing, the apparatus consists of three vessels arranged in series, the first, labeled Stage I, having inlets for introducing polymer latex and brine thereinto. An agitator is provided in each of the vessels or stages in order to keep the composition of the reaction mixture substantially uniform in each stage. The overflow from Stage I discharges into a draft tube arranged in the vessel labeled Stage II. Water is added to the latex in the overflow in order to decrease the percentage of solids in the slurry passing to Stage II. An inlet for the introduction of carbon dioxide into the draft tube is provided and a separate agitator is arranged in the draft tube for forcing the coagulated latex downwardly and out of the draft tube into the main vessel. Stage II is preferably operated as a closed system in order to avoid the loss of carbonic acid by recovering and recycling the unabsorbed carbon dioxide. The overflow from Stage II discharges into the vessel labeled Stage III, which is provided with an inlet for the supply of caustic soda or other alkaline liquid. The treated polymer and associated liquids pass from Stage III to suitable filtering and reslurrying equipment not shown, whereupon the polymer is separated and dried in tunnel-type dryers or the like.

The process in accordance with the present invention is applicable to polymer latices prepared by the soap emulsion technique. The process is particularly applicable to the coagulation of latices of synthetic rubber-like materials obtained by the polymerization of conjugated diolefins such as butadiene-1,3, isoprene, piperylene, dimethyl butadiene, methyl pentadiene, taken singly or in mixtures or in mixtures with a minor proportion of a copolymerizable compound containing a single C=C group such as acrylonitrile, methacrylonitrile, styrene, alpha-methyl styrene, para-methyl styrene, alpha-methyl para-methyl styrene, para-methoxy styrene, halogenated styrenes such as para-chloro styrene, para-bromo styrene and the like, ethyl fumarate, methyl acrylate, ethyl acrylate, methyl methacrylate, methyl vinyl ketone, methyl isopropenyl ketone and the like.

The latices which may be coagulated in accordance with the present invention are prepared in the known manner as by dispersing the polymerizable raw materials in from about an equal to a two-fold quantity of water, using a soap type emulsifier. Such emulsifiers include the alkali metal or ammonium salts of higher fatty acids such as sodium, potassium or ammonium stearates, palmitates, oleates or similar salts of the acid mixture obtained by selective hydrogenation of the acid mixture derived from tallow. The polymerization is carried out at temperatures between about 60 and 150° F. and in the presence of a polymerization catalyst such as hydrogen peroxide or an alkali metal persulfate or perborate and a polymerization modifier such as diisopropyl xanthogen disulfide, dodecyl mercaptan or the mixture of mercaptans obtained from commercial lauryl alcohol.

In order to obtain optimum results by coagulation in accordance with the present invention, the latex should have a pH value within the range of 7.0 to about 9.0. The latices prepared as described above ordinarily have a pH of about 7.6 to about 9.0 or slightly higher. Although unreacted monomers are preferably stripped from the latex prior to the introduction thereof into the coagulation system, the presence of such materials does not materially affect the system.

The salts which are used in Stage I, the creaming stage, are water soluble salts which do not react with the soaps used as emulsifiers. Suitable salts include sodium, potassium and ammonium chlorides, nitrates, sulfates, carbonates and phosphates. For the sake of brevity these types of salts, including the salts of ammonia, will be referred to hereinafter generically as "inorganic alkali salts." The concentration of the salt in the solution used for creaming and the total amount employed varies somewhat with the properties of the polymer latex. The solution used should ordinarily be sufficiently dilute and should be used in such amounts that there is no appreciable precipitation or flocculation of the polymer in Stage I. When using sodium chloride brine for example, a solution of about 8% concentration is used in an amount about equal in volume to the latex.

Carbonic acid ($CO_2$ plus water) or gaseous carbon dioxide, when used as the coagulant in Stage II, are of unobvious advantage. It has the advantage that being an extremely weak acid, its addition is not too critical. It also produces a more porous crumb than is obtained when using mineral acids and converts a smaller percentage of the soap to free fatty acid than when using mineral acids. The amount of acid varies with the pH of the latex entering Stage I; and as the pH of the latex increases, the acid requirements increase. The acid concentration is kept low in order to prevent localized acid spots and to facilitate the general operation. Optimum results have been obtained with acid concentrations of about 0.1 to 0.001 weight per cent.

The alkali employed in Stage III of the system may be an alkali metal or ammonium hydroxide. Instead of the hydroxide we may also use certain salts such as sodium carbonate or tri sodium phosphate and the like. The concentration in which the alkaline substance is employed is not critical but it is usually added so that a pH in the range of about 9 to 10 is maintained.

It is not necessary to control the temperature in any of the three stages within critical limits and the coagulation is ordinarily effected at temperatures between about 20 and 60° C. The over-all holdup time in the system is within the range of about ½ to about 6 hours, depending upon the composition of latex.

The following examples are illustrative of the present invention:

A latex was prepared from a mixture containing the following materials:

| | Parts |
|---|---|
| Butadiene | 74 |
| Acrylonitrile | 26 |
| Lorol mercaptan (commercial mixture of $C_{10}$–$C_{18}$ mercaptans, predominantly lauryl mercaptan, prepared from the corresponding mixture of alcohols obtained by hydrogenation of cocoanut oil) | 0.5 |
| Potassium persulfate | 0.3 |
| Oleic acid | 3.71 |
| Sodium hydroxide | 0.446 |
| Water | 200 |

The polymer was prepared in a stainless steel reactor equipped with an agitator of the turbo type. The temperature maintained in the reactor was in the range of 95° F. for 14 hours, and monomer conversion was 70%. Shortstopping was effected with 0.4% (on dry polymer basis) of hydroquinone; and stabilization, with 2.0% phenyl-B-naphthylamine. The latex was then subjected to a steam distillation under 26 inches of mercury at a temperature of 130° F. for two hours. The coagulation procedure was effected at room temperature.

The latex was coagulated in apparatus such as is shown in the drawing in which the three stages consisted of three 5-gallon drums equipped with ordinary laboratory mixers and overflow pipes. The following were the conditions maintained in the several stages.

Stage I

| | |
|---|---|
| pH of latex | 8.5–9.0 |
| Volume of latex cc./min | 70 |
| Volume of water cc./min | 70 |
| Volume of 8% NaCl cc./min | 70 |
| pH of cream | 8.5–9.0 |
| Residence time min | 90 |

Stage II

| | |
|---|---|
| Water (Stage I overflow) cc./min | 40 |
| Agitation R. P. M. (draft tube) | 500 |
| Coagulant | Carbon dioxide |
| Coagulant rate of supply g./min | 0.25–1.0 |
| pH of slurry | 7.0–7.5 |
| Residence time min | 75 |

Stage III

| | |
|---|---|
| Volume of caustic (1.7 N NaOH) cc./min | 10–20 |
| pH of slurry | 10.0 |
| Residence time min | 70 |

The coagulation system was started up by the simultaneous introduction of latex and brine into Stage I. As Stage I overflowed the water was started in the overflow pipe and the system continued until the level in Stage II was above the impellers, whereupon the rotors were started and the acid was allowed to flow. At the beginning the rate of acid addition was increased in order to compensate for the holdup of latex cream below the impeller, but the flow rate was adjusted after the particle size had increased sufficiently, usually $\frac{1}{32}''$ to $\frac{1}{8}''$ in diameter.

No mechanical difficulties were encountered during the continuous coagulation or during the subsequent filtering, washing and drying of the polymer. The coagulated particles were generally spherical in shape and quite uniform in size and displayed no tendency to cake on the filter.

The polymer thus obtained was compounded and cured according to the following recipe and evaluated.

| | Parts |
|---|---|
| Polymer | 100.0 |
| Coal tar | 4.0 |
| Wood rosin | 4.0 |
| Ozokerite wax | 1.5 |
| Zinc oxide | 5.0 |
| Stearic acid | 1.5 |
| Benzothiazyl bisulfide accelerator | 1.25 |
| Diphenyl-guanidine | 0.25 |
| Sulfur | 1.5 |
| Carbon black pigment | 45.0 |

The time of curing was 45 minutes, and the temperature was 287° F. Data obtained upon evaluating the polymer coagulated continuously in accordance with the present invention and compared with the same polymer coagulated batchwise by the addition of an equal volume of saturated sodium chloride solution to the stripped latex, increasing particle size by the addition of solid carbon dioxide, filtering and reslurrying and compounded according to the same recipe are summarized in Table I set out below. Samples $A_1$ and $A_2$ were prepared as described above while samples $B_{1-4}$ were prepared in the same way except that potassium oleate was used as the emulsifier instead of sodium oleate. It may be seen from this table that there is very little difference in the physical characteristics of the polymers coagulated by the two methods. Whatever differences that do exist seem to be in favor of continuous coagulation.

TABLE I

Comparison of butadiene-acrylonitrile copolymer from continuous and batch coagulation

| Sample | Type | | Tensile | Elong. | Williams | Band | Water Abs. | Ash | Extract |
|---|---|---|---|---|---|---|---|---|---|
| $A_1$ | (a) | (c) | 3,750 | 660 | 122–12 | 8' | 3.6 | 0.20 | |
| $A_2$ | (b) | (c) | 3,750 | 710 | 124–14 | 8' | 3.5 | 0.20 | |
| $B_1$ | (b) | (c) | 3,450 | 720 | 142–20 | 18' | 1.7 | 0.21 | 31.2 |
| $B_2$ | (a) | (c) | 3,750 | 630 | 144–32 | 19' | 4.8 | 0.04 | 25.8 |
| $B_3$ | (b) | (d) | 3,650 | 660 | 144–25 | 19' | 3.2 | 0.09 | 17.4 |
| $B_4$ | (a) | (d) | 3,750 | 700 | 142–31 | 12' | 1.32 | 0.12 | 15.8 |

(a) Continuous coagulation.
(b) Batch coagulation.
(c) Two water reslurries.
(d) Two water reslurries at a pH 11.0.

Example 2

A butadiene-acrylonitrile copolymer containing about 35% combined nitrile was prepared in substantially the same manner as the copolymer of Example 1 except that the butadiene and acrylonitrile were used in a ratio of 62/38 butadiene to acrylonitrile.

The latex thus obtained is inherently more unstable than the latex of Example 1 as shown by its tendency to coagulate rather than cream when dilute brine is added in Stage I. This is true regardless of the pH of the original latex. Similarly, the quantity of $CO_2$ added in Stage II is quite critical, a slight excess causing very bad agglomeration. These conditions are largely remedied by the addition of about 0.5% sodium bicarbonate (total weight basis) to the dilute brine. This acts as a buffer in Stage II and allows closer control of particle size.

The data obtained on compounding and evaluating the polymers coagulated under different conditions as indicated are summarized in Table II set out below.

TABLE II

*Continuous coagulation of butadiene-acrylonitrile containing 35% combined nitrile*

| Sample No. | Coagulation Conditions | Tensile | Elong. | Williams | Aromatic Extract |
|---|---|---|---|---|---|
| | | Pounds | Percent | | Mg. |
| BT-1 | Regular, brine, $CO_2$, NaOH. Particles small but irregular. | 4,350 | 600 | 159-57 | 12.8 |
| BT-2 | Same as 1 | 4,350 | 650 | 161-57 | 10.8 |
| BT-4 | As 1 but some $ZnSO_4$ added in Stage II. Particles irregular but very non-tacky. | | | | 9.3 |
| BT-5 | As 4 but pH of water reslurry not adjusted | | | | 11.5 |
| BT-7 | 0.5% $NaHCO_3$ in brine; $ZnSO_4$ used in Stage II; pH of reslurry water not adjusted. | 4,250 | 610 | 165-55 | 11.7 |
| BT-8 | As 7 but pH of water reslurry raised to 10-11 | 4,100 | 560 | 162-57 | 10.2 |
| BT-10 | As 1 but 0.5% $NaHCO_3$ added to brine. Particles uniform and about ⅛″ in diameter. | 3,750 | 510 | 161-63 | 8.0 |
| BT-12 | As 10 but particles about ¼″ | 4,300 | 510 | 152-70 | 10.7 |
| BT-13 | As 10, two water reslurries | 4,150 | 560 | 138-28 | 15.6 |
| BT-14 | As 10, two caustic reslurries | 4,300 | 580 | 150-31 | 13.1 |
| (a) CC-Na | As 10, but optimum particle size | 4,450 | 650 | 152-19 | 8.7 |
| (b) CC-Zn | As CC-Na, but 0.1% $ZnSO_4$ added in Stage II | 4,350 | 650 | 152-32 | 13.0 |

(a) Water absorption 2.1%.
(b) Water absorption 3.9%.

It may be seen from the foregoing description that we have provided the art with a highly advantageous and efficient system for coagulating polymer latices. By means of the continuous system in accordance with the present invention a saving in the time necessary for the pressureing of the latex as with butadiene, for flashing the repressuring agent or butadiene after the coagulation is complete and for measuring the reactants is achieved. There is also a saving in the labor necessary to carry out the batchwise operation and the cost of recovery of butadiene. A continuous system in accordance with the present invention would have an appreciably greater capacity for an equivalent initial cost and that substantial savings would undoubtedly be noticed in decreased rubber losses due to foaming in leaching tanks, which occurs as a result of traces of residual butadiene from the pressure coagulation. Moreover, in view of the uniformity in particle size, proper leaching is readily effected resulting in products of low soap and fatty acid content and superior over-all physical properties. In addition, the coagulation procedure in accordance with the present invention may be carried out with a net saving in sodium chloride or other coagulant of approximately 30% as compared with the batch coagulation described above.

The foregoing description contains a limited number of embodiments of the present invention. It will be understood, however, that this invention is not limited to the specific details disclosed since numerous variations are possible without departing from the scope of this invention as defined in the following claims.

What we claim and desire to secure by Letters Patent is:

1. The method of continuously coagulating latices of synthetic rubber-like materials prepared by polymerizing a mixture of butadiene and at most an equal amount of acrylonitrile in aqueous emulsion using a soap emulsifier which comprises creaming the latex in a first stage by mixing a stream of latex having a pH between 7.6 and 9 and a stream of a solution of a water-soluble inorganic alkali salt which does not react with the soap to form an insoluble precipitate in an amount which is insufficient to effect coagulation of the latex, passing a stream of the creamed latex to a second stage, coagulating the latex in the second stage by reducing the pH to a value between 7 and 7.5 by the addition of carbon dioxide thereto and thereby forming a suspension of uniform porous, non-sticky particles having a diameter between 1/32″ and ⅛″ and passing a stream of the coagulated latex to a third stage, treating the coagulated latex in the third stage with an alkali to increase the pH of the coagulated latex to a value between 9 and 10 and so to convert free fatty acid present therein to a soluble soap.

2. The method of continuously coagulating latices of synthetic rubber-like materials prepared by polymerizing a major proportion of butadiene and a minor proportion of acrylonitrile in aqueous emulsion using a fatty acid soap emulsifier which comprises creaming the latex in a first stage at a pH between 8.5 and 9 by mixing a stream of latex and a stream of an aqueous solution of sodium chloride containing a small concentration of sodium bicarbonate buffer, the amount of aqueous solution admixed being insufficient to effect coagulation of the latex, passing a stream of the creamed latex to a second stage, coagulating the latex in the second stage at a pH between 7 and 7.5 by adding carbon dioxide thereto whereby uniform non-adhesive rubbery particles are formed which have a diameter between 1/32″ and ⅛″, passing a stream of the coagulated latex to a third stage and treating the coagulated latex in the third stage with an aqueous solution of sodium hydroxide to increase the pH to a value between 9 and 10 and so to convert free fatty acid therein to a soluble soap.

3. In the method of continuously coagulating latices of synthetic rubber-like materials prepared by polymerizing a major proportion of butadiene and a minor proportion of acrylonitrile in aqueous emulsion using a soap emulsifier, in combination the steps comprising (1) creaming the latex in a first zone at a pH between 7.6 and 9 by mixing a stream of latex and a stream of a dilute aqueous solution of sodium chloride in an amount insufficient to effect coagulation of the latex, (2) passing a stream of the creamed latex to a closed second zone, (3) coagulating the latex in the second zone by adding carbon dioxide thereto, to the extent of obtaining an acid concentration of about .1 to 0.001% total weight basis whereby non-adhesive uniform coagulated particles are formed, having a diameter between $\frac{1}{32}''$ and $\frac{1}{8}''$, (4) passing a stream of the coagulated latex to a third zone and (5) treating the coagulated latex in the third zone with an aqueous solution of sodium hydroxide to increase the alkalinity of the coagulated latex to a pH value of 9 to 10 to convert free fatty acid therein to a soluble soap.

4. The method as defined in claim 3 wherein also 0.5% (total weight basis) of sodium bicarbonate is added to the stream of latex in time to act as a buffer in the acid coagulation step.

HAROLD J. ROSE.
LEWIS C. PRICE.

REFERENCES CITED

The following references are of record in the file of this patent:

UNITED STATES PATENTS

| Number | Name | Date |
| --- | --- | --- |
| 2,378,732 | Semon | June 19, 1945 |
| 2,385,172 | Vanderbilt | Sept. 18, 1945 |
| 2,424,648 | Bixby | July 29, 1947 |